United States Patent [19]

Harissis et al.

[11] Patent Number: 5,012,380
[45] Date of Patent: Apr. 30, 1991

[54] ARTICLE SURVEILLANCE PROTECTION OF FLEXIBLE MAGNETIC COMPUTER DATA STORAGE DISKS

[75] Inventors: Peter J. Harissis, Rush; Jeffrey P. Serbicki, Rochester, both of N.Y.

[73] Assignee: Eastman Kodak Company, Rochester, N.Y.

[21] Appl. No.: 398,021

[22] Filed: Aug. 24, 1989

[51] Int. Cl.⁵ .................. G11B 5/82; G11B 23/03; G11B 15/04
[52] U.S. Cl. ..................... 360/135; 360/133; 360/60
[58] Field of Search .................. 360/135, 133, 60

[56] References Cited

U.S. PATENT DOCUMENTS

| | | |
|---|---|---|
| 3,665,449 | 5/1972 | Elder et al. . |
| 3,747,086 | 7/1973 | Peterson . |
| 3,820,104 | 6/1974 | Fearon . |
| 4,074,249 | 2/1978 | Minasy . |
| 4,425,999 | 1/1984 | MacDonald et al. ............. 360/133 |
| 4,553,136 | 11/1985 | Anderson, III et al. . |
| 4,710,752 | 12/1987 | Cordery . |
| 4,794,470 | 12/1988 | Lauffenburger et al. .......... 360/133 |
| 4,800,458 | 1/1989 | Okita ............................... 360/135 |
| 4,910,625 | 3/1990 | Albrecht et al. .................. 360/135 |

Primary Examiner—A. J. Heinz
Assistant Examiner—Jeff Evans
Attorney, Agent, or Firm—Warren W. Kurz

[57] ABSTRACT

A flexible magnetic data storage disk with a ferromagnetic surveillance ring-shaped marker integrally bonded to the disk substrate around the central aperture. A series of slits are formed in the disk substrate under the marker to serve as "tear initiators" if a user attempts to remove the surveillance marker thus rendering the disk unusable and thereby protecting the data on the disk from unauthorized removal from a secure area.

8 Claims, 1 Drawing Sheet

ARTICLE SURVEILLANCE PROTECTION OF FLEXIBLE MAGNETIC COMPUTER DATA STORAGE DISKS

FIELD OF THE INVENTION

This invention relates to the field of article surveillance protection of data recorded on flexible magnetic computer data disks.

BACKGROUND OF THE INVENTION

Article surveillance systems that work on the principle of detecting the presence of a particular form of ferromagnetic material in a periodically changing low level magnetic field are well known. U.S. Pat. No. 4,553,136 illustrates a representative system of this type in which an article to be protected against unauthorized removal from a defined area, such as a store or library, has a marker attached to it that has in it a strip of low coercivity ferromagnetic material of high permeability. When the article, with the marker attached, is brought into an interrogation zone in which the low level periodically changing magnetic field is applied via a radiating antenna located at the edge of the zone, the presence of the strip modifies the pattern of the applied field, generating magnetic sub-fields at harmonics of the fundamental frequency of the applied field. These harmonic fields are picked up by a receiving antenna also located at the edge of the interrogation zone and fed to a receiver where they are detected and used to trigger an alarm to signal the unauthorized removal of the article. Other representative examples of ferromagnetic marker systems of this general type are found in U.S. Pat. Nos. 3,665,449; 3,747,086; 3,820,104 and 4,710,752.

There is a recognized need for surveillance systems to provide corresponding security protection for computer disk magnetic media. With the proliferation in business and government of personal computers and the ready portability and easy concealability of the miniature data disks used by these computers it is important to provide article surveillance sensor systems for flexible computer data storage disks that ensure that sensitive data is not lost or compromised intentionally or unintentionally by unauthorized removal from secure areas in which the data is normally used. While non-magnetic marker systems are available for surveillance purposes and would have the advantage of not interfering with the magnetic media of data disks, they are generally not physically suited to the miniature size and slim geometries of conventional 5.25" and 3.5" flexible data disks employed with personal computers.

One proposal for a surveillance system for flexible magnetic data disks involves the attachment of a low coercivity, high magnetic permeability ferromagnetic marker strip to an inside surface of the jacket in which the disk is housed. This, however, would allow the system to be easily defeated by removing the disk from the jacket and reinserting it into another, non-protected jacket with the data on the disk still intact.

An improved form of surveillance protection for computer data disks is disclosed in the commonly assigned U.S. Pat. No. 4,910,625. As described in this patent, a band of preferably amorphous ferromagnetic marker material is integrally formed directly on the data disk about the central aperture of the disk and concentric therewith. This has the advantage that the disk itself bears the surveillance marker thus eliminating the ability to defeat the protection by removing the disk from the jacket. Moreover, by integrally forming the marker on the disk substrate, as by adhesive or ultrasonic bonding, any attempts to remove the marker will have a tendency to damage the disk thus effectively protecting the data on the disk from unauthorized removal from a secure area. While advantageous for this purpose, it has been found that extremely cautious removal of the marker, for example with the aid of a razor blade, can be effective, in some cases, to remove the marker without damaging the disk sufficiently to make the disk unusable, thus circumventing one of the purposes of integrally bonding the marker to the disk.

It is therefore an object of the present invention to provide improved article surveillance protection for a computer data disk, and more specifically for a flexible disk.

SUMMARY OF THE INVENTION

In accordance with the object of the invention therefore, there is provided a computer data disk having article surveillance protection which comprises a flexible disk substrate having a central aperture and provided with a series of slits formed in the substrate around the inner circumference of the disk adjacent the periphery of the central aperture. The disk also includes magnetic recording material formed on the surface of the disk on at least one side thereof for recording of data on the disk and is provided with a surveillance marker comprised of an extended length of ferromagnetic material formed around at least a substantial portion of the inner circumference of the disk and integrally bonded to the disk substrate so as to overlie the slits formed in the substrate. Preferably, the slits are cut in the substrate so as to be spaced some minimum distance from the periphery of the central aperture thereby to maintain continuous integrity of the inner circumferential edge of the disk which is important in the production process to assure reliable production of certifiable disks.

DETAILED DESCRIPTION

Figure 1:
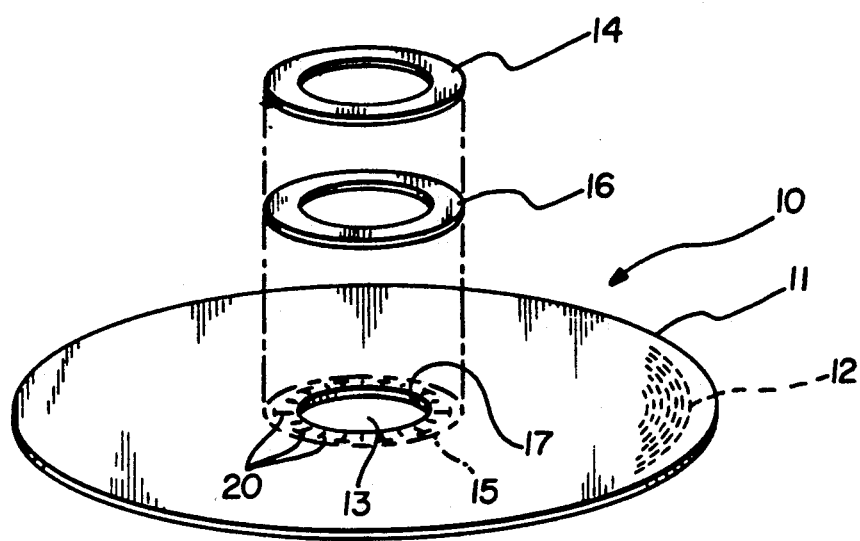
FIG. 1 is a perspective view of a 5.25" magnetic data disk embodying the invention.

In FIG. 1 there is shown a 5.25" magnetic data disk 10 which comprises a circular disk substrate 11 of thin high polymer material on which a coating of magnetic recording material is formed on one or both surfaces for recording and reading of data on concentric tracks 12 on the disk by a recording/reproducing magnetic head (not shown). A circular central aperture 13 formed in the center of the disk is adapted for reception of the drive spindle (not shown) of a disk drive system. In a conventional disk of this type, a circular reinforcing ring 14 is conventionally secured to the disk substrate 11 surrounding the periphery 17 of central aperture 13 by suitable adhesive means to lengthen the reusable life of the disk by protecting the inner circumference of disk 10 from prematurely wearing out in normal use. Dotted line 15 indicates the inner circumferential region of disk substrate 11 that is typically covered by reinforcing ring 14.

For article surveillance security purposes, a ferromagnetic marker ring 16 is interposed between reinforcing ring 14 and the circular region 15 of disk substrate 10. Marker 16 is preferably formed of an amorphous ferromagnetic material having a relatively low coercivity and a high magnetic permeability and is integrally bonded to disk substrate 10 in region 15 by suitable adhesive means or by a conventional ultrasonic bonding process. The coercivity of marker 16, as measured in an external magnetic field changing its field strength and direction periodically with a frequency of 60 Hz, preferably should not exceed about 5 oersteds and most preferably should be less than 0.5 oersteds. Correspondingly, the material should have relatively high magnetic permeability with a value preferably not lower than 20,000 and, most preferably, should be greater than 100,000. Suitable material for use as the hub ring marker 16 would be an amorphous ferromagnetic material such as is described in U.S. Pat. No. 4,553,136. A material of this type is sold under the trademark "Metglas" by Allied Signal Corporation of Morristown, N.J. Alternatively, a ferromagnetic material having a high Barkhausen effect, such as described in U.S. Pat. No. 4,660,025, may also be used.

Although shown as separate elements, reinforcing ring 14 and marker 16 may be combined as a single element with marker 16 serving the reinforcing function of ring 14. It will also be appreciated, as disclosed in aforementioned U.S. Pat. No. 4,910,625, that marker 16 may also be used on a 3.5" microfloppy disk by positioning the marker between the disk and the disk-engaging flange of the central drive hub normally used with the 3.5" disk. In such a case marker 16 may be adhesively coated on both sides and thus replace the double-sided adhesive ring typically used to bond the hub flange to the disk.

As previously noted, marker 16 is formed integrally onto the polymer material of the disk by means of either a suitable adhesive material, preferably a high strength pressure sensitive or heat-activated adhesive, or an ultrasonic bonding process. The objective is to assure that any attempt to forcibly remove the marker 16, so as to circumvent article surveillance security, would physically damage the disk 10 by tearing or deforming the substrate material thus making the disk unable to maintain proper concentricity on the disk drive. This would make it virtually impossible to read the data on the disk in a disk drive thereby effectively protecting the data, if not the disk, against unauthorized removal from a secure surveillance area.

It has been found however that even with such integral bonding of the marker to the disk, it is possible in some cases to carefully remove the marker and still maintain the usability of the disk. The polymeric resin materials typically used for disk substrate inherently are tear resistant and it is therefore sometimes possible with extreme care to pull apart the marker and substrate without damaging the disk. In other cases, a razor blade can be inserted to aid in separating the substrate and marker without undue damage. Therefore, to enhance the liklihood that such tampering with the marker will render the disk unusable, a series of slits 20 are formed in the substrate 11 under the marker 16 in the region 15 around the periphery of central aperture 13. Slits 20 thus serve as "tear initiators" that facilitate tearing or deforming of the substrate material if an effort is made to pull the marker off the disk. Additionally, as will be seen, the configuration of the slits can be chosen to increase the chance that a razor blade will snag on the slit and thus cause sufficient tearing or deformation of the disk as to render it unusable. The intention is that any tearing resulting from tampering with the marker will progress through to the periphery 17 of the central aperture 13, thus making it difficult if not impossible for the disk to be properly seated concentrically on the disk drive spindle of a computer thereby preventing the computer from reading the data on the disk. Alternatively, the tear can also progress into the recorded data region on the disk thereby making it impossible for the read head of the computer disk drive to operate with the damaged disk.

Figures 2, 3:
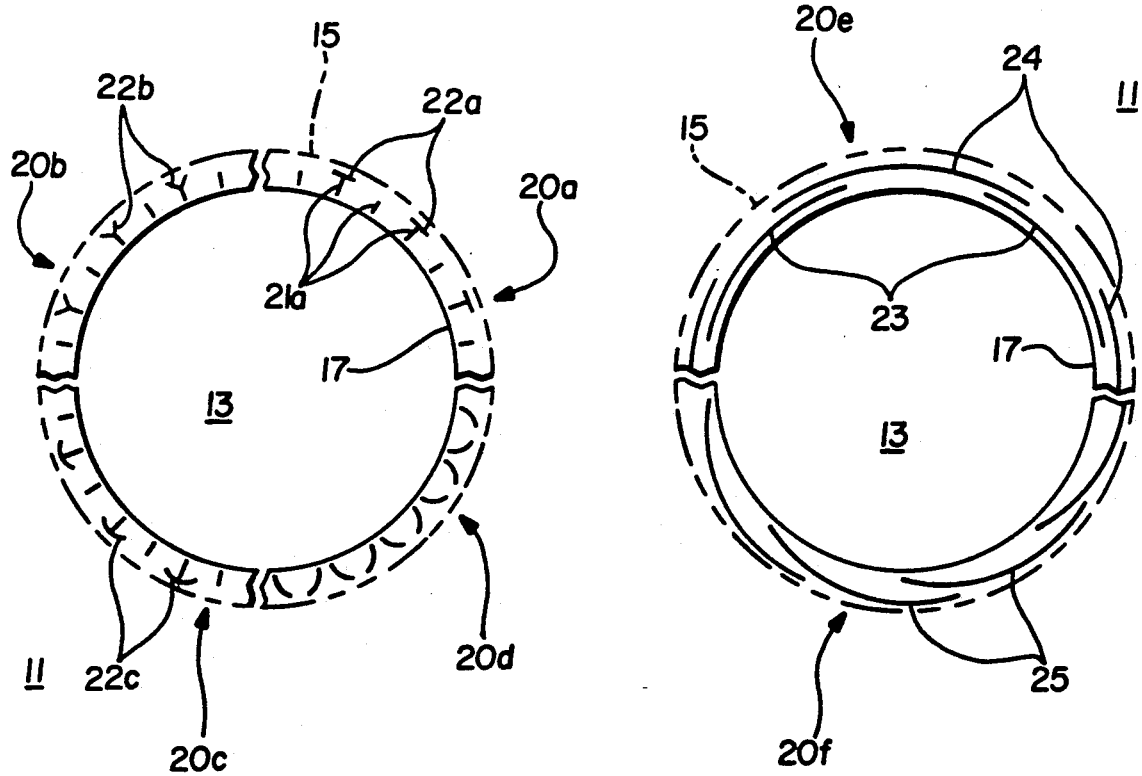
FIG. 2 is a plan view of the central portion of a computer disk illustrating various embodiments of the invention.
FIG. 3 is a plan view of the central portion of a computer disk illustrating alternative embodiments of the invention.

In FIG. 2, four alternative configurations of slits are illustrated for convenience around a single disk aperture 13, although it will be appreciated that a single configuration would be chosen to be formed in the substrate 11 entirely around the periphery 17 of the aperture. Considering slit configuration 20a, a series of radially extending slits 21a are formed in the substrate in the peripheral region bounded by periphery 17 and dotted line 15, the latter representing the outer circumference of the marker 16 when it is bonded to the disk. While the slits may extend to the periphery 17, it is preferred that slits 21a commence at a point that is slightly spaced radially outward from periphery 17. The reason for this is to preserve the continuous unbroken integrity of periphery 17, which is the inner circumference of disk 10. This is considered important, particularly in the production process, to assure reliable production of certifiable disks. It is also of significance in the case of 5.25" disks during their normal use to assure that the disk is properly seated concentrically on the disk drive spindle so that the data on the disk can be recorded and read properly each time the disk is used.

To enhance the liklihood that the substrate will tear if the marker is tampered with, either by pulling on the reinforcing ring 14 or the marker 16 or by inserting a razor blade between marker 16 and the disk substrate 11, a series of tangential slits 22a are formed in the substrate to intersect with radial slits 22a. The alternative configurations of slits 20b and 20c are similar to slits 20a except that the configurations of intersecting slits 22b and 22c are modified slightly. In slits 20b, the intersecting slits are angled while in slits 20c the intersecting slits are curved. As is the case with slits 20a, slits 20b–20d also are spaced radially outward from periphery 17 to maintain integrity of the periphery for normal use of the disk. It will be appreciated that other similar configurations may be employed with equally successful results. For example, slits 20d are comprised of small arcuate slits that offer both the tear initiating and razor-snagging functions of the intersecting configurations of slits 20a–20c.

In FIG. 3, two alternative configurations of elongated slits 20e and 20f are illustrated. The configuration of slits 20e comprise a repeating series of staggered circumferential slits 23 and 24 in overlapping relation while slit configuration 20f comprises elongated curvilinear slits 25 that are similar to the slits 20d of FIG. 2. As with the slit embodiments 20a–20d of FIG. 2, slit embodiments 20e and 20f are spaced radially outward of periphery 17 to preserve normal operating integrity of the disk while at the same time providing excellent tear initiation and snagging characteristics to thwart tampering.

The invention has been described in detail with particular reference to a presently preferred embodiment, but it will be understood that variations and modifications can be effected within the spirit and scope of the invention.

What is claimed is:

1. A computer disk having article surveillance protection comprising:

a flexible disk substrate having a central aperture and having a series of slits formed in the substrate around the periphery of the central aperture;

a magnetic recording material formed on the surface of the disk on at least one side thereof for recording of data on the disk;

and a surveillance marker comprised of an extended length of ferromagnetic material formed around at least a substantial portion of the periphery of the central aperture and integrally bonded to said disk substrate overlying the slits formed in the substrate, said slits being adapted to provide tear-initiation sites which operate to induce tearing of said flexible substrate in the event of an attempt to remove said marker from said substrate after said marker has been integrally bonded to said substrate.

2. The data disk of claim 1 in which said marker is in the shape of a ring and is bonded to the disk substrate concentrically with the disk central aperture.

3. The data disk of claim 1 in which at least some of said slits extend radially of the disk central aperture and some of said slits are transverse to the radial direction on said disk.

4. The data disk of claim 3 in which said radial and transverse slits intersect in the area of said disk lying underneath the marker.

5. The data disk of claim 1 in which at least some of said slits form curvilinear lines running generally circumferentially in said disk substrate around said central aperture.

6. The data disk of claim 5 in which said curvilinear slits are staggered alternately radially inwardly and outwardly of the center of said aperture.

7. The data disk of claim 6 in which said staggered curvilinear slits lie in overlapping relationship.

8. The data disk of claim 1 in which all of said slits lie entirely underneath said marker and are spaced a predetermined minimum distance radially outward from the periphery of the central aperture so as to retain continuous unbroken integrity of the inner circumference of the disk.

* * * * *